March 16, 1943.  C. L. MARTIN  2,314,005
FLUID MOTOR
Filed March 1, 1941   3 Sheets-Sheet 1

INVENTOR
Charles L. Martin

March 16, 1943.   C. L. MARTIN   2,314,005
FLUID MOTOR
Filed March 1, 1941   3 Sheets-Sheet 2

INVENTOR
Charles L. Martin

March 16, 1943. C. L. MARTIN 2,314,005
FLUID MOTOR
Filed March 1, 1941 3 Sheets-Sheet 3

INVENTOR
Charles L. Martin

Patented Mar. 16, 1943

2,314,005

UNITED STATES PATENT OFFICE 2,314,005

FLUID MOTOR

Charles L. Martin, St. Louis, Mo., assignor to Carter Carburetor Corporation, St. Louis, Mo., a corporation of Delaware Application March 1, 1941, Serial No. 381,235

4 Claims. (Cl. 121—157)

This invention relates to fluid motors of the pilot valve type and more particularly to novel control means which adapt the motor for operating an automobile windshield wiper.

Fluid motors as now used for operating automobile windshield wipers utilize over-center reversing valves having springs for effecting rapid reversal of the motor at the ends of the stroke. The numerous small valve parts and springs are necessarily of delicate construction and generally require servicing after limited use. A pilot valve type of motor, as incorporated in the present invention, eliminates such springs and delicate valve parts and is considerably more simple and durable than the toggle valve motor.

Windshield wipers are customarily provided with manual control or "parking" means, but, generally, the blades can be parked only in one predetermined position, whereas it may be desirable to change the parked position, particularly in case accumulated ice or other solid matter interferes with the normal stroke.

Accordingly, it is an object of the present invention to provide a novel parking device for a windshield wiper motor whereby the wiper blade may be selectively parked at either side, out of the range of vision.

Another object is to provide an improved motor for actuating a windshield wiper which is of relatively simple, efficient, and durable construction.

Another object is to provide novel means to cut-off the differential pressure applied to the motor either incident to parking of the blades or in addition to the parking control.

Still another object is to provide a fluid motor of the pilot valve type with various parts compactly arranged to facilitate the formation of the various passages and occupy a minimum of space.

These objects and other more detailed objects hereafter appearing are attained substantially by the structure illustrated in the accompanying drawings in which—

Figure 1:
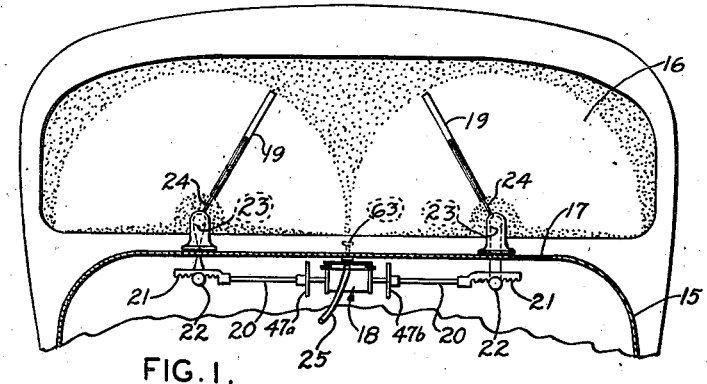
Fig. 1 is a front view and section showing a portion of an automobile body and windshield with windshield wiping mechanism applied thereto.

Fig. 1 shows a portion of an automobile body, including hood 15 for enclosing the engine (not shown) and a windshield 16. Supported beneath the cowl 17 is a fluid motor, generally indicated at 18, for operating the wiper blades 19 through the intermediary of transmission mechanism including reciprocating shafts or rods 20 having at their outer extremities, racks 21 for operating pinions 22, belted to shafts 23 supporting wiper arms 24. Motor 18 is of the pilot valve type and is connected by means of a tube 25 to a suitable source of suction, as, for instance, the engine intake manifold. In this instance, differential pressures of the intake manifold and the atmosphere operate the motor, suitable valves being provided for reversing the motor at the end of each stroke, but, obviously, other sources of fluid pressure differential may be utilized.

Figure 2:
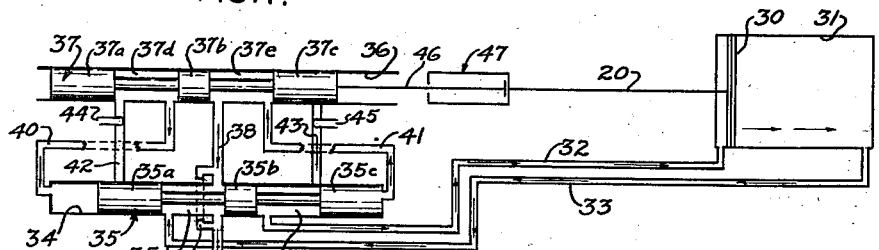
Figs. 2 and 3 are diagrammatic representations of a fluid motor of the pilot valve type, such as is utilized in the present invention, with the control valve being omitted for clearness, the figures showing the valves oppositely disposed for opposite actuation of the main motor piston.
Figure 3:
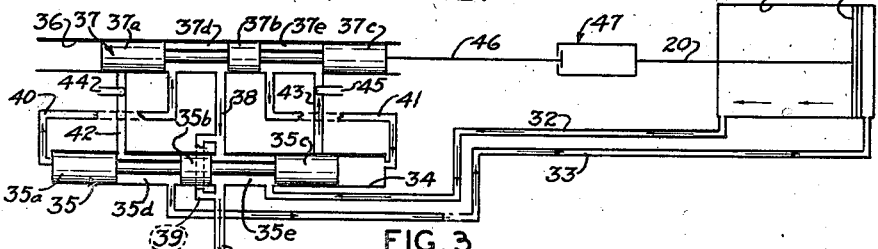
Figure 8:
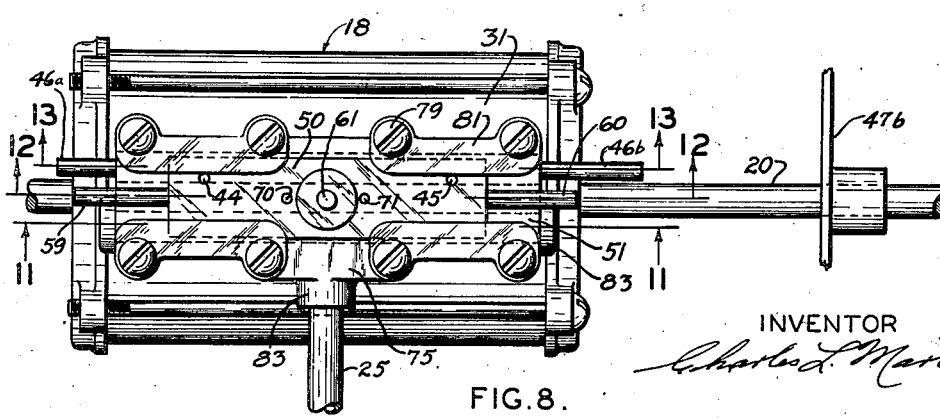
Fig. 8 is a top view showing a practical embodiment of the motor and valve structure.

Figs. 2 and 3 illustrate, diagrammatically, the essential working parts of a pilot valve type of motor with the novel control valve omitted. In these figures, the main motor piston 30 is slidable in cylinder 31, which, at its opposite ends, is connected by means of passages 32 and 33 to a cylindrical closed chamber 34 loosely receiving the main valve 35 which has three enlarged portions 35a, 35b and 35c closely fitting the chamber wall, and annular recesses 35d and 35e. Located conveniently adjacent the chamber 34 is a second cylindrical chamber 36, which may be open at the ends. Slidable within this chamber is a pilot valve structure, generally indicated at 37 and including three enlarged portions 37a, 37b and 37c closely fitting the chamber walls, and intermediate annular recesses 37d and 37e.

Suction connection 25 communicates with substantially the middle portion of main valve chamber 34 and thence, by means of a passage 38, with pilot valve chamber 36. Suction passages 25 and 38 are aligned and a by-pass 39 connecting suction passages 25 and 38 insures continued communication therebetween regardless of the position of main valve 35. The ends of main valve chamber 34 are connected to pilot valve chamber 36 by means of passages 40 and 41 and the valve chambers are additionally connected by passages 42 and 43 which are vented to the atmosphere as at 44 and 45. Pilot valve 37 has an actuating pin 46 projecting therefrom which is connected to main piston rod 20 by means of a lost motion connection, indicated generally at 47.

The operation of the above parts of the motor is as follows: Assuming main valve 35 is in the position shown in Fig. 2, suction passage 25 will be in communication with the right hand end of main motor cylinder 31 through recess 35d, in main valve 35, and passage 33. Suction is also communicated to the right hand end of main valve chamber 34 through internal by-pass 39, passage 38, recess 37e in the pilot valve, and passage 41. Atmosphere will be communicated to the left hand end of main motor cylinder 31 through vent 45, passage 43, annular recess 35e in main valve 35, and motor passage 32. Piston 30 will, accordingly, be urged to the right by the differential fluid pressures on the opposite sides thereof. When the piston reaches the right hand end of its stroke, as shown in Fig. 3, pilot valve 37 will be moved to the right through lost motion connection 47. Suction will then be communicated to the left hand end of main valve chamber 34 through internal by-pass 39 in the chamber wall, passage 38, recess 37d in the pilot valve, and passage 40. Main valve 35 will be moved to the left hand end of its chamber 34 so as to connect the left hand end of motor cylinder 31 to suction, through motor suction passage 32, and place the right hand end of cylinder 31 in communication with the atmosphere through vent 44, passage 42, recess 35d in main valve 35, and motor passage 33. Motor piston 30 will then reverse its movement until pilot valve 37 is again moved to the position in Fig. 2 through lost motion connection 47 to complete the cycle.

Figure 4:
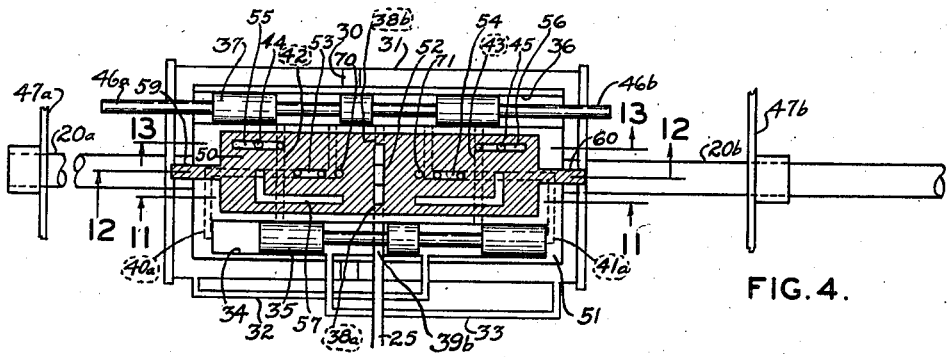
Fig. 4 is a top view showing the slide valve substantially on section line 4—4 of Fig. 11 and in the "on" or operating position, other parts being represented diagrammatically.
Figure 5:
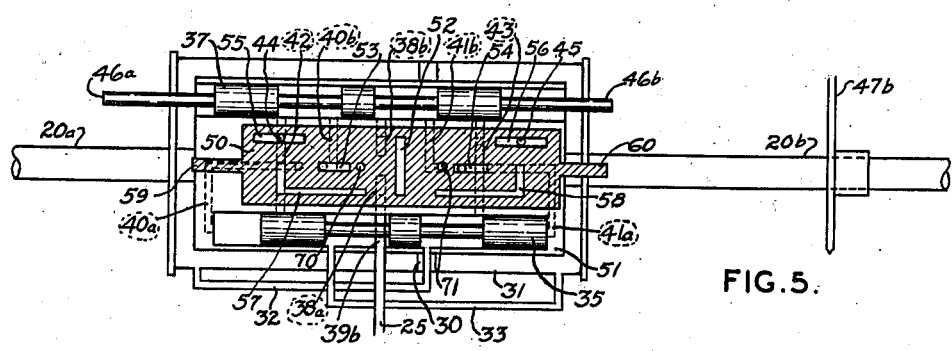
Fig. 5 is a view similar to Fig. 4 but showing the control in position to cut-off the differential pressure applied to the motor piston.
Figure 6:
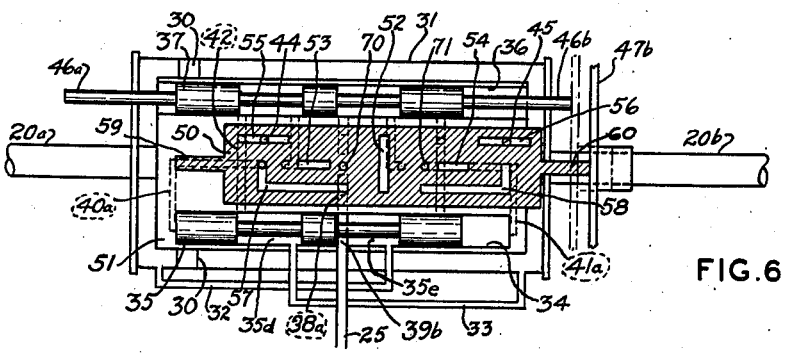
Fig. 6 is another diagrammatic view similar to Fig. 4 but showing the control valve moved to a parking position.

In order to adapt the motor for use with an automotive windshield wiper, a novel manual control is provided, as diagrammatically illustrated in Figs. 4, 5 and 6. In these figures, the various motor parts are designated with the same numerals as the corresponding parts in Figs. 2 and 3. The valve mechanism is here shown mounted on top of main motor cylinder 31 (shown diagrammatically), as in Fig. 1, and motor piston 30 is provided with oppositely extending piston rods 20a and 20b having collars 47a and 47b rigidly secured thereto and constituting lost motion operative connections between the motor piston and the pilot valve, corresponding to connection 47 in Figs. 2 and 3. Pilot valve 37 has oppositely projecting stems 46a and 46b for cooperating with collars 47a and 47b to shift the pilot valve at the ends of the motor stroke.

The form of by-pass shown at 39 in Figures 2 and 3 is replaced by an internal annular recess 39b in Figures 4, 5, 6 and 7.

Figure 10:
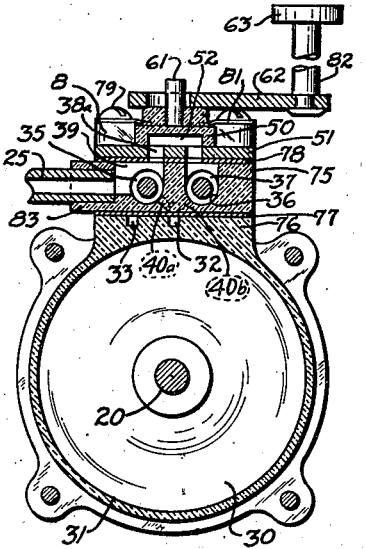
Fig. 10 is a vertical transverse section taken on the center line of Fig. 9.
Figure 11:
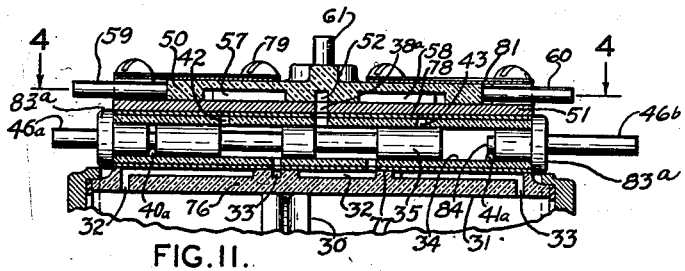
Figs. 11, 12 and 13 are partial vertical transverse sections taken on the corresponding section lines of Figs. 3 and 8.
Figure 12:
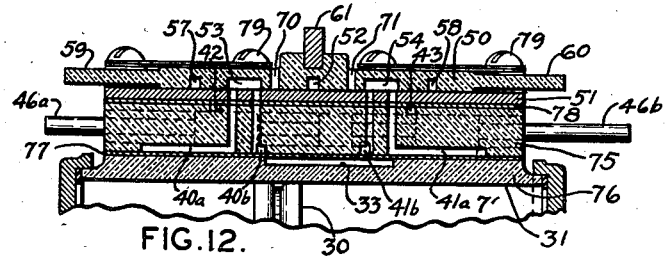
Figure 13:
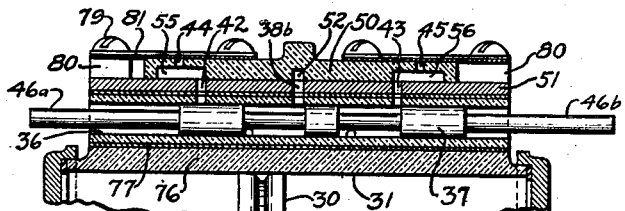

The control valve is in the form of a plate 50 slidably mounted on a stationary valve plate 51, shown in the diagrams as located between cylindrical valve chambers 34 and 36. The valve plates are recessed and passaged, as described hereafter, for controlling the fluid passages connecting the valve chambers. As best shown in Figs. 5 and 6, the main suction line connecting the valve chambers has two separated portions 38a and 38b in valve plate 51, each communicating with one of the valve chambers and opening through the upper surface of the stationary valve plate by means of a rectangular port, as shown. A transverse recess or slot 52 is provided in the under surface of the sliding control valve 50 for connecting these passage portions, as in Fig. 4, when the slide valve is in its "on" position to operate the motor. Passages 40 and 41 of Figs. 2 and 3, are similarly formed, each of two separated parts, as at 40a and 40b and 41a and 41b, these terminating in circular ports in the surface of plate 51, and the sliding control valve is provided with a cooperating pair of longitudinal recesses 53 and 54 in its under surface for connecting the respective passage portions. Atmospheric passages 42 and 43 in the stationary plate communicate with longitudinal slots 55 and 56 in the slide valve which are connected to atmosphere by means of vertical ports 44 and 45 opening through the upper surface of the slide valve (Fig. 13). In addition, the slide valve is provided with angular recesses 57 and 58 for a purpose to be described hereafter. A pair of fingers 59 and 60 project oppositely from slide valve for cooperating with collars 47a and 47b on the piston rod to shift the valve as described hereafter. The slide valve may be manually controlled by any suitable means, such as pin 61, slotted lever 62 and manipulating button 63 (Figs. 1 and 10.)

Figs. 8 to 13, inclusive, are enlarged views of a practical embodiment of the motor and valve structure, the various parts being designated so far as possible with the same reference numerals as the corresponding parts in the previous figures to facilitate comparison. Cylindrical valve chambers 34 and 36 are horizontally disposed in blocks 75 which is secured to a pad 76 formed on the upper wall of motor cylinder 31. Stationary valve plate 51 rests on top of block 75 and sliding control valve 50, in turn, rests on top of plate 51. Gaskets 77 and 78 are interposed respectively between pad 76 and block 75 and between the block and valve plate 51 and the assembly is maintained by means of bolts 79. Bushings 80 and lip plates 81 are interposed beneath the heads of bolts 79 and form a longitudinal guideway for control valve 50. The control valve is shifted, as previously explained, by means of a button 63 formed rigidly with a shaft 82 pivotally supported in the cowling or other structure convenient to the driver. Block 75 is extended at one side adjacent main valve chamber 34 to form an apertured boss 83 for receiving the end of suction connection 25.

The various passages, ports, and recesses are designated as in Figs. 4, 5 and 6 and will not be further described. Fig. 10 shows clearly the arrangement of suction by-pass 39 for connecting passage portion 38a through valve plate 51 with suction line 25 and also recess 52 in the slide valve. Each end of main valve cylinder 34 is provided with a plug as at 83a having a reduced extension as at 84 so as to prevent the end of the valve from covering passages 40a and 41a in extreme positions of the valve (see Fig. 11).

Manual control of the motor by means of the control valve is effected as follows:

In Fig. 4, the motor valves 35 and 37 are in the same positions as in Fig. 2, and the slide valve is in the intermediate or "on" position so as to bring valve slots 52, 53 and 54, respectively, into connecting alignment with suction passage portions 38a and 38b, 40a and 40b, and 41a and 41b. Since passages 42 and 43 are always in communication with atmosphere through ports 44 and 45, suction will be applied to the right hand end of main valve 35 and atmospheric pressure to the left hand end thereof, as in Fig. 2. Similarly, suction will be applied through passage 33 to the right hand end of main motor cylinder 31 and atmosphere to the left hand end thereof through passage 32. As long as the control valve remains in the intermediate position and suction is applied through tube 25, the motor will operate back and forth as described above.

In order to stop the application of differential pressure to the motor, the slide valve is moved, by means of button 63 (Fig. 10), slightly to the right, as shown in Fig. 5, so as to break the fluid connections between passage portions 38a and 38b, 40a and 40b, and 41a and 41b, so as to prevent shifting of main valve 35 even though the main motor piston may continue in its movement far enough to reverse pilot valve 37.

For parking the wiper blades at predetermined ends of their strokes and out of the range of vision, I provide a second shifted position of the control valve, as shown in Fig. 6, in which the slide valve is moved still farther to the right than in Fig. 5. The valve slots 52, 53 and 54 remain inoperative with respect to the suction passages, but angular recess 57 in the slide valve is now positioned so as to complete a fluid connection between passage portions 40a and 38a whereby suction is by-passed therethrough to the left hand end of main valve 35, regardless of the position of pilot valve 37. An atmospheric port 70 extending vertically through the slide valve is now positioned to connect passage portion 41a to atmospheric pressure whereby main valve 35 is immediately positioned and arrested in its left hand position, as in Figs. 3 and 6. The left end of main motor cylinder 31 is then connected to suction through cut-away space 35e in main valve 35 and, since passage 42 remains in fluid connection with atmospheric port 55 in the slide valve, the right end of motor cylinder 31 remains in communication with atmospheric pressure through cut-away space 35d in the main valve and through passage 33, regardless of the position of pilot valve 37. Accordingly, the motor piston will be moved to and held in its left hand extreme position immediately the control valve is shifted for parking, as in Fig. 6, so as to park the wiper blade always at the same ends of their strokes.

During movement of the motor piston to its parked position, collar 47b engages finger 60 on the slide valve and urges the latter to the shut-off position, as in Fig. 5. This added function is not essential since, in some cases, it may be desirable to leave the full differential pressure applied to the motor piston during parking.

The slide valve may also be shifted to its extreme left hand position, or opposite to that in Fig. 6, in which case angular slot 58, which is arranged symmetrically with respect to the above referred to angular slot 57, is moved into position to connect passage portions 38a and 41a to expose the right hand end of main valve 35 to suction, and atmospheric port 70 is positioned to expose passage 40a and, accordingly, the left hand end of main valve 35 to atmosphere. Accordingly, when the control valve is so shifted, main valve 35 will be immediately moved to its right hand extreme position, as in Fig. 2, so as to expose the right hand end of main cylinder 31 to suction and the left hand end thereof to atmosphere and to urge and hold main piston 30a in its extreme right hand position, regardless of the positioning of the pilot valve. Thereafter, the control valve will be shifted slightly inwardly or to the right by engagement of collar 47a with finger 59 to cut-off the atmospheric connection to main valve chamber 34 and main cylinder 31.

Figure 7:
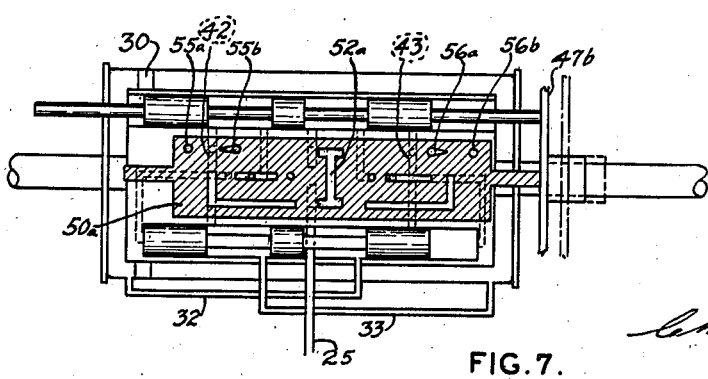
Fig. 7 is a view similar to Figs. 4, 5 and 6 but showing a slight modification of the control valve, the valves being shown in the parked position.
Figure 9:
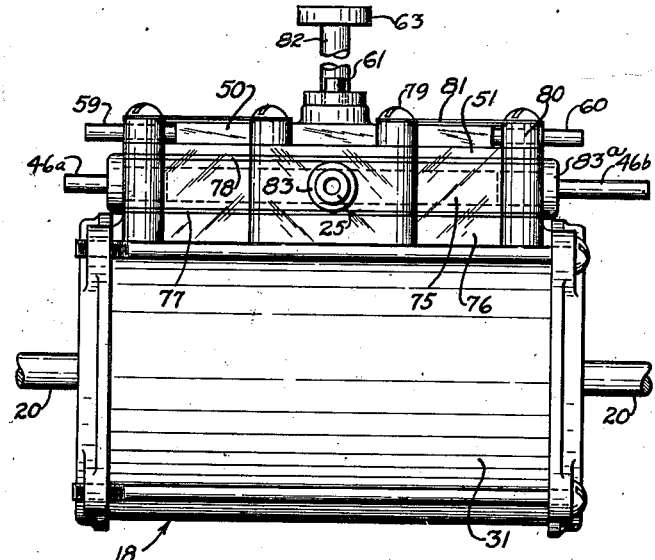
Fig. 9 is a side view of the same.

In Fig. 7 there is shown a modification in which all parts are identical with those shown in Figs. 4, 5 and 6, with the exception of the atmospheric ports corresponding with slots 55 and 56 and ports 44 and 55 in control valve 50. In this form, symmetrical ports 55a, 55b, 56a and 56b replace recesses 55 and 56 in Figs. 4, 5 and 6. Ports 55b and 56a are tapered to provide a throttling control and thus permit varying speed of the motor by slightly varying the position of the control valve from its intermediate or operating position as in Fig. 4. The cylindrical ports 55a and 56b communicate, respectively, with passages 42 and 43 when the control valve has been shifted to its parked positions, one of which is shown in Fig. 6. Fig. 7 shows control valve 50a shifted inwardly to its cut-off position by means of collar 47b during the parking movement of the motor.

The motor valve structure described above is compactly formed, and due to the omission of the usual springs and toggle mechanism is substantially simpler and more durable construction than other fluid motors. Moreover, the motor is extremely flexible, means being provided for parking the blade always at a selected end of the normal stroke or for cutting off the differential pressure at the point where the operator may desire. This feature has particular advantage in cases where snow and ice may be caked near the lower edge of the windshield, so as to prevent movement of the wiper arm to the corresponding end of its stroke and making it desirable to park at the other end of the stroke where the arm may be maintained out of the range of vision of the driver.

Various features may be modified as will occur to those skilled in the art and the exclusive use of such modifications as come within the scope of the appended claims is contemplated.

I claim:

1. In a fluid motor for a windshield wiper, a part movable to operate the wiper, automatic fluid actuated valve mechanism for reversing the application of power to said part, means including a manually controlled valve for arresting said fluid actuated valve mechanism whereby the fluid pressure will act upon said part to park the wiper, and means for automatically shutting off the fluid pressure as the wiper is parked.

2. In a fluid motor for a windshield wiper, a part movable to operate the wiper, automatic fluid actuated valve mechanism for reversing the application of power to said part, means including a manually controlled valve movable to a first position for positioning and arresting said fluid actuated valve mechanism whereby the fluid pressure will act upon said movable part to park the wiper, said manually controlled valve being movable to a second position to stop the application of differential fluid pressure acting upon said part, and means movable with said part for automatically shifting said manually controlled valve from said first position to said second position during the parking movement of said part.

3. In a fluid motor for a windshield wiper, a part movable to operate the wiper, automatic fluid actuated valve mechanism for reversing the application of power to said part for moving the wiper back and forth, parking means including a manually controlled valve, said manually controlled valve being movable in one direction to a first position to cut-off the differential fluid pressure acting upon said part, and to a second position to position and arrest said valve mechanism whereby the fluid pressure will act upon said part to park the wiper, and means movable with said part for mechanically shifting said manually controlled valve from said second to said first position during the parking movement of said part.

4. In a fluid motor for a windshield wiper, a part movable to operate the wiper, a main fluid operated valve for controlling the application of power to said part, passages for applying differential fluid pressures to said part and said main valve for actuating the same, pilot valve structure movable with said part and associated with said passages for reversing said main valve at the ends of the normal stroke of said part, and a single manual valve device interposed in said passages and operable to by-pass said pilot valve structure during operation of the motor to position and arrest said main valve in a predetermined position whereby fluid pressure may act on said part to park the same and the wiper in a predetermined position, and to cut-off the supply of differential fluid pressures.

CHARLES L. MARTIN.